United States Patent [19]

Fidi et al.

[11] Patent Number: 4,512,009
[45] Date of Patent: Apr. 16, 1985

[54] STYLUS FOR STEREO PICKUPS

[75] Inventors: Werner Fidi, Baden; Gunter Nawrata, Mistelbach, both of Austria

[73] Assignee: AKG Akustische u.Kino-Geräte Gesellschaft m.b.H., Austria

[21] Appl. No.: 419,028

[22] Filed: Sep. 16, 1982

[30] Foreign Application Priority Data

Sep. 24, 1981 [AT] Austria ................. 4107/81

[51] Int. Cl.³ ........................ G11B 3/46; G11B 3/50
[52] U.S. Cl. .................................. 369/170; 369/171; 369/139
[58] Field of Search ............ 369/170, 173, 171, 172, 369/135, 139, 146, 147, 148, 149

[56] References Cited

U.S. PATENT DOCUMENTS 3,909,008  9/1975  Sakai ................. 369/171
3,975,025  8/1976  Obata et al. .......... 369/171
4,054,758  10/1977  Fidi ................... 369/170

FOREIGN PATENT DOCUMENTS 56-25209  3/1981  Japan ................. 369/170

OTHER PUBLICATIONS

Werner Fidi, "A New Suspension System for Phono Styli," Audio, Mar., 1976, pp. 24-28.

Primary Examiner—Charles Frankfort
Assistant Examiner—Thomas P. Matecki
Attorney, Agent, or Firm—McGlew and Tuttle

[57] ABSTRACT

A stylus for stereo pickups tracking acoustic events mechanically recorded in grooves of a plate shaped record carrier comprises a soft iron tube which is adapted to embody a transducer and which has an open end into which a needle support tube is engaged and secured such as by adhesive connection. The needle is carried by the support with its axis substantially perpendicular to the axis of the support tube at the outward projecting end of the tube. The soft iron tube and the support tube are engaged in an opening of a support plate and embraced by a first elastic element engaged in the opening and elastically engaged with the soft iron tube. The construction includes a second elastic element engaged around a portion of the soft iron tube and the support tube at a location adjacent the open end of the soft iron tube and forms a damping body of a material of high internal friction.

6 Claims, 6 Drawing Figures

STYLUS FOR STEREO PICKUPS

FIELD AND BACKGROUND OF THE INVENTION

This invention relates in general to record pickups and in particular to a new and useful stylus for stereo pickups which track acoustic events mechanically recorded in grooves of a plate shaped record carrier.

With such an arrangement, which is disclosed for example in Austrian Pat. No. 341,798, an excellent quality of transmission can be obtained. However, experience has shown that in such pickups, the frequency response at the end of the transmission range at the high frequencies includes two small deviations from the linearity, in the form of two little humps. These are residues of resonance points of which one, the so called tip resonance, is located right before the flank at the upper end of the transmission range and is caused by the resilience of the groove in the record carrier. The other resonance point, located somewhat lower than the tip resonance is caused by the supporting tube of the stylus which is not quite rigid. Both resonance points can be suppressed to a large extent by employing a material with a proper internal friction for the elastic bearing element and the supporting tube as well as by an additional friction provided in the zone of the elastic support of the stylus. Still, as mentioned above, a certain residual ripple remains in the highest frequencies of the transmission range, which is due to the two resonance points as mentioned. Experience has shown that an increase of the coefficient of friction of the elastic support and/or of the additional friction produces no effect on the residual ripple of the frequency response.

SUMMARY OF THE INVENTION

The invention is directed to an arrangement eliminating the residual ripple in the frequency characteristic of a stereo pickup in the high frequency range.

In accordance with the invention, a soft iron tube which is adapted to embody a transducer has an open end into which a needle support tube is inserted and mechanically connected such as by an adhesive. The outer end of the needle support tube carries a needle which extends substantially perpendicular to the axis of the support tube. The support plate with an opening therethrough is provided with a first elastic element at the opening which embraces the soft iron tube and resiliently supports it. In addition a second elastic element is engaged around a portion of the support tube and the adjacent open end of the soft iron tube and forms a damping body of a material by internal friction. Due to this solution, the mechanical friction of the supporting tube is augmented, and with a suitable dimensioning of the friction, a completely linear horizontal frequency characteristic is obtained. By means of an equivalent circuit diagram, which will be discussed hereinafter, it may be proved that the oscillation of a stylus can be favorably affected by an additional friction substantially damping the supporting tube. The damping body must be made of a material having a high internal friction, particularly in the high transmission frequencies.

In accordance with a feature of the invention, the damping body is made of a hard plastic, such as a hard rubber or similar material and it is fixed to the stylus by shrink fitting or vulcanization or gluing. Suitably shaped bodies are a cylinder, truncated cone, double truncated cone, or sphere. A substantial feature of the invention is that such a shaped body is virtually inseparably connected to both the supporting tube and the soft iron tube. In addition to the mentioned connections, press-fitting or ultrasonic welding may be provided.

Accordingly, it is an object of the invention to provide a stylus for stereo pickups in which a support tube is engaged in a soft iron pipe which is adapted to embody a transducer and a carries a needle at its outer end and wherein the iron pipe is supported on the plate element by a resilient or elastic body and it is connected to the support tube such as by adhesive and is also resiliently supported by a second damping body of a material of high internal friction.

A further object of the invention is to provide a stylus which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
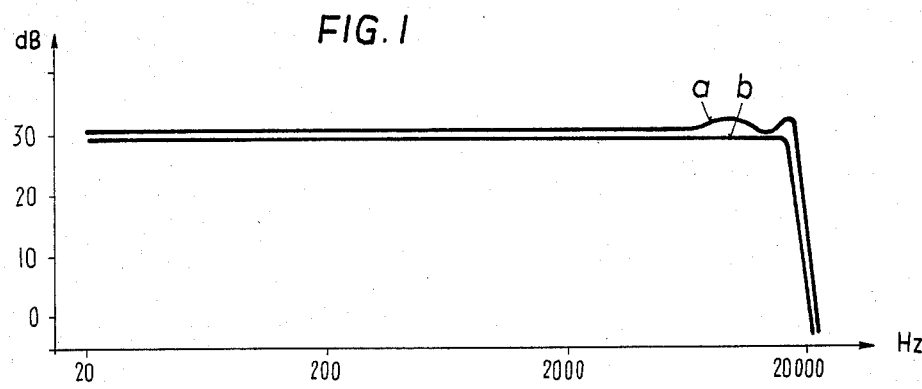
FIG. 1 is a diagram showing frequency responses of the inventive construction in comparison with the prior art.

Referring to the drawings in particular, the invention comprises a stylus for stereo pickups which track acoustic events mechanically recorded in grooves of a plate shaped record carrier.

In FIG. 1, curve a represents the frequency response of a prior art stereo pickup. The line applies to both channels. It is evident that two little humps appear at the end of the transmission range, which are due to the above mentioned resonance excursions. Curve b shows the improvement of the frequency response upon applying the invention. Any humps have disappeared at the upper end of the range and the frequency characteristic is completely linear and horizontal.

Figure 2:
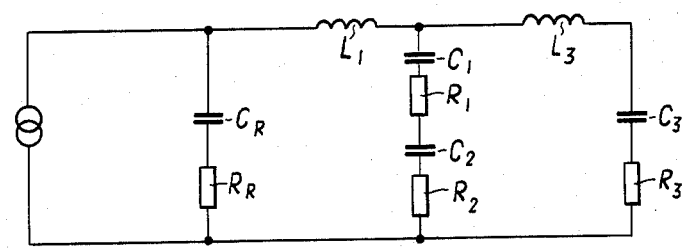
FIG. 2 is an equivalence circuit diagram of a pickup of the type of the present invention.

The effect of the inventive damping body on the frequency response may be explained by means of an equivalent circuit diagram of electrical quantities, instead of mechanical ones. In FIG. 2, $R_R$ stands for the friction in the groove,
$C_R$ for the resilience in the groove,
$L_1$ for the effective mass of the supporting tube, inclusive of the pickup needle,
$C_1$ for the resilience of the supporting tube,
$R_1$ for the internal friction of the supporting tube,
$C_2$ for the resilience of the damping element,
$R_2$ for the friction of the damping element, $L_3$ for the effective mass of the soft iron tube,
$C_3$ for the springiness of the soft iron tube, and
$R_3$ for the internal friction of the soft iron tube.

The diagram shows that the capacitance $C_2$ representing the resilience of the damping body is connected along with series connection $C_1$, $R_1$. Since for the frequencies of the upper transmission range, $C_2$ represents virtually a shorting, the damping of resistor $R_2$ becomes fully effective.

Figure 3:
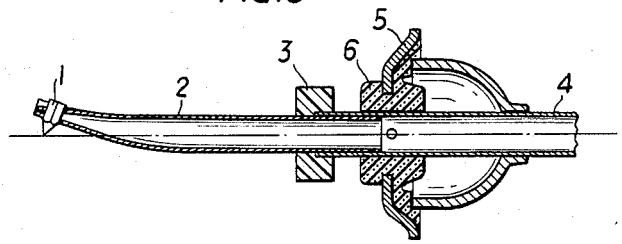
FIG. 3 is a diagrammatical partial sectional view of the pickup constructed in accordance with the invention.

FIG. 3 is a diagrammatical sectional view showing a part of a pickup with a stylus which is damped in accordance with the invention. The stylus is supported by an elastic shaped body 6 which is inserted in an opening of a disc-shaped plate 5. The stylus comprises a supporting tube 2 carrying a pickup needle 1 at one end and projecting or firmly engaging at its other end into a soft iron tube 4 embodying the transducer element. Both tubes are connected integrally to each other, for example by gluing. At the location on the stylus where supporting tube 2 emerges from soft iron tube 4, an inventive damping body 3 is seated which also is integrally connected to both tubes 2 and 4. The manner of connection is advantageously by adhesive. Body 3 is of one piece and of homogenious material as shown. Body 3 is smaller than body 6 and is close to body 6 on tube 2 rather than to needle 1.

Figure 4:
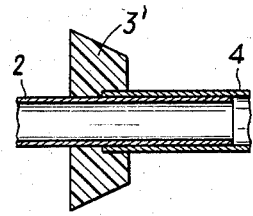
FIGS. 4, 5 and 6 are partial views similar to FIG. 3 showing other embodiments of damping bodies for use with the invention.
Figure 5:
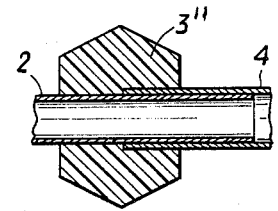
Figure 6:
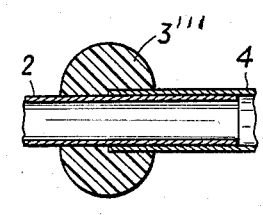

FIGS. 4, 5 and 6 show suitable embodiments of damping bodies 3', 3'' and 3'''. This body may be designed as in FIG. 3, as well as in one of the shapes (truncated or double truncated cone, spherical) shown in FIGS. 4, 5 and 6 respectively. The shape depends on the mechanical properties of the damping tube, particularly on its oscillating capability and the spatial conditions in the housing of the pickup. In any case, the invention makes it possible to manufacture a stereo pickup with a completely smooth, linear and horizontal frequency response for both channels, and without residues of resonance phenomena, particularly at the upper end of the transmission range.

While specific embodiments of the invention have been shown and described in detail to illustrate the application of the principles of the invention, it will be understood that the invention may be embodied otherwise without departing from such principles.

What is claimed is:

1. A stylus for stereo pickups tracking acoustic events mechanically recorded in grooves of a plate shaped record carrier, comprising a soft iron tube adapted to embody a transducer and having an open end, a needle support tube having one end engaged in said soft iron tube at said open end and having an opposite end, a needle carried by said needle support tube and having an axis substantially perpendicular to the axis of said support tube and being located adjacent the opposite end of said support tube, a support plate having an opening therethrough through which said soft iron tube extends, a first elastic element engaged with said plate in the opening thereof and embracing and elastically engaging said soft iron tube to pivotally support said soft iron tube, said soft iron tube extending entirely through said first elastic element, and a second elastic element engaged around a portion of said soft iron tube adjacent its open end and a portion of said support tube which is adjacent the open end of said soft iron tube, said second elastic element forming a one piece damping body of a homogeneous material of high internal friction being firmly connected to the portion of said soft iron tube and said support tube which it covers, said second elastic element being smaller than said first elastic element and closer to said first elastic element than to said needle, said second elastic element being harder than said first elastic element and wherein two residual ripples in the frequency characteristic of the stereo pickup in the high frequency range are eliminated.

2. A stylus according to claim 1, wherein said damping body comprises a rotationally symmetrically shaped body.

3. A stylus according to claim 1, wherein said damping body comprises a cylinder.

4. A stylus according to claim 1, wherein said damping body comprises a truncated cone.

5. A stylus according to claim 1, wherein said damping body comprises a double truncated cone.

6. A stylus according to claim 1, wherein said damping body comprises a sphere.

* * * * *